US006701750B2

(12) United States Patent    (10) Patent No.:     US 6,701,750 B2
Maeda et al.                  (45) Date of Patent:     Mar. 9, 2004

(54) METHOD AND APPARATUS FOR MOLDING A GLASS PRODUCT

(75) Inventors: Nobuhiro Maeda, Nishitama-gun (JP); Jun Saitou, Akishima (JP)

(73) Assignee: Hoya Corporation, Tokyo (JP)

( * ) Notice: Subject to any disclaimer, the term of this patent is extended or adjusted under 35 U.S.C. 154(b) by 237 days.

(21) Appl. No.: 09/942,997

(22) Filed: Aug. 31, 2001

(65) Prior Publication Data

US 2002/0046577 A1 Apr. 25, 2002

(30) Foreign Application Priority Data

Sep. 1, 2000 (JP) ........................ 2000-265179

(51) Int. Cl.$^7$ ............... C03B 11/00; C03B 11/12
(52) U.S. Cl. ............... 65/103; 65/208; 65/226; 65/348; 65/85
(58) Field of Search ............... 65/85, 207, 102, 65/103, 208, 226, 348, 351, 104, 83, 111, 119, 122, 123, 127, 24, 61, 64, 25.1; 264/1.1, 1.21; 425/808, 352; 249/111

(56) References Cited

U.S. PATENT DOCUMENTS

| | | | | |
|---|---|---|---|---|
| 3,650,703 A | * | 3/1972 | Labelle et al. | 117/25 |
| 4,168,961 A | * | 9/1979 | Blair | 65/66 |
| 4,629,489 A | * | 12/1986 | Hirota et al. | 65/102 |
| 4,738,703 A | * | 4/1988 | Izumitani et al. | 65/64 |
| 4,915,720 A | * | 4/1990 | Hirota et al. | 65/64 |
| 4,921,519 A | * | 5/1990 | Schinker et al. | 65/39 |
| 5,120,343 A | * | 6/1992 | Monji et al. | 65/268 |
| 5,194,082 A | * | 3/1993 | Hirota | 65/102 |
| 5,228,894 A | * | 7/1993 | Sato et al. | 65/102 |
| 5,823,011 A | * | 10/1998 | Poting | 65/305 |
| 5,987,922 A | * | 11/1999 | Hirota et al. | 65/64 |
| 6,003,338 A | * | 12/1999 | Yamamoto et al. | 65/102 |
| 2003/0159467 A1 | * | 8/2003 | Hirota et al. | 65/26 |

FOREIGN PATENT DOCUMENTS

| | | | | |
|---|---|---|---|---|
| EP | 0223506 | * | 5/1987 | C03B/9/34 |
| JP | 63-162539 | * | 6/1988 | C03B/11/00 |
| JP | 63-162539 | | 7/1988 | C03B/11/00 |
| JP | 6-32624 | | 2/1994 | C03B/11/00 |
| JP | 6-72725 | | 3/1994 | C03B/11/00 |
| JP | 6-157051 | | 6/1994 | C03B/11/00 |
| JP | 10-101347 | | 4/1998 | C03B/11/10 |

* cited by examiner

Primary Examiner—Steven P. Griffin
Assistant Examiner—Carlos Lopez
(74) Attorney, Agent, or Firm—Sughrue Mion, PLLC

(57) ABSTRACT

On molding a glass product by pressing a glass gob by the use of a mold composed of upper and lower dies each of which has a molding surface, a molten glass is supplied as the glass gob onto the molding surface of the lower die. Cooling is carried out for an upper surface of the glass gob supplied onto the molding surface of the lower die. After the cooling, heat radiation suppression is carried out to suppress heat radiation from the glass gob so that an inner part and an upper part of the glass gob are close in temperature to each other. Thereafter, the glass gob is pressed by the molding surfaces of the upper and the lower dies when the glass gob has a viscosity within a range between $10^{3.5}$ and $10^{6.5}$ poises (dPa·s). Preferably, the heat radiation suppression is carried out by making a heat shielding member lower in temperature than the inner part of the glass gob approach the upper part of the glass gob in a non-contact state.

10 Claims, 6 Drawing Sheets

UPPER SURFACE COOLING

HEAT RADIATION SUPPRESSING

A
GLASS SUPPLYING

A
CUTTING

B
UPPER SURFACE COOLING

C~E
HEAT RADIATION SUPPRESSING

F
GLASS PRESSING

G~K

GLASS REMOVING

METHOD AND APPARATUS FOR MOLDING A GLASS PRODUCT

BACKGROUND OF THE INVENTION

This invention relates to a method and an apparatus for molding a glass product such as an optical lens blank and, in particular, to a method and an apparatus of a so-called direct press system in which a molten glass is supplied to a mold to be pressed in the mold.

As a method of molding an unfinished glass product (hereinafter called a lens blank) as a state before it is ground and polished into a finished or final glass product such as an optical lens, use has widely been made of a direct press system excellent in productivity. In the direct press system, a glass material is melted in a furnace into a molten glass. An appropriate amount of the molten glass is cut off by the use of a cutter such as a shear to be supplied onto a lower die (drag). The molten glass supplied onto the lower die forms a glass gob having a generally marble-like shape under the effect of its surface tension. The lower die with the glass gob placed thereon is transferred by a conveying arrangement such as a turntable to a position where an upper die (cope) is arranged. Then, the glass gob is pressed by the upper and the lower dies to mold a glass product as the above-mentioned lens blank having a shape matching the configuration of a cavity surrounded by the upper and the lower dies. In a grinding/polishing step subsequently carried out, the surface of the lens blank is ground and polished to produce a final product such as a spectacle lens, a camera lens, and an optical pickup lens.

On the other hand, it is recently pointed out that grinding and polishing scraps produced in the grinding/polishing step have an adverse influence upon the environment. Taking this into account, it is strongly desired to mold the lens blank which will require only a small grinding allowance so as to reduce the grinding and polishing scraps.

In the molding of the lens blank by the use of the existing direct press system, however, it is impossible to considerably reduce the grinding allowance of the glass. Specifically, in the existing direct press system, so-called sink marks are distributed on a glass surface due to shrinkage of the glass after the molten glass is pressed. Upon pressing the molten glass, an outer peripheral part of the molten glass is cooled by external air after the molten glass is supplied to the lower die and before it is pressed by the upper and the lower dies. Therefore, the temperature of the molten glass is remarkably lowered in the outer peripheral part as compared with its inner part. If the temperature of the outer peripheral part becomes lower than a certain temperature, the flowability of the glass is decreased so that the viscosity of the glass reaches an inappropriate level at which press-molding is difficult. Taking this into consideration, it is necessary to press the molten glass before the temperature of the inner part of the molten glass is sufficiently cooled, i.e., while the viscosity of the glass is as low as about $10^3$ poises (dPa·s). This results in an increase in heat shrinkage of the inner part of the glass after pressing and in occurrence of sink marks on the glass surface due to the temperature difference between the inner part and the outer peripheral part. The occurrence of sink marks deteriorates a reproducibility in transferring the shape of a molding surface of the mold so that a large grinding allowance is required. In case where the sink marks produced on the glass surface after pressing are not uniformly distributed but concentrated to a local area, a much larger grinding allowance is inevitably required.

In order to suppress the occurrence of sink marks, various proposals have been made (see Japanese Unexamined Patent Publications (JP-A) Nos. 10-101347, 6-32624, 6-72725, 6-157051, and 63-162539). However, no disclosure is made about a technique for effectively reducing the temperature difference between the inner part and the outer peripheral part of the molten glass, which results in occurrence of sink marks.

On the other hand, in the direct press system, a lower part of the molten glass is continuously cooled towards the temperature of the lower die after it is supplied to the lower die preliminarily kept at or around a glass transition point Tg. Therefore, limitation is imposed such that the molten glass must be pressed and molded before the viscosity of the molten glass at the lower part exceeds a threshold viscosity beyond which the press-molding is impossible.

SUMMARY OF THE INVENTION

It is therefore an object of this invention to provide, in molding of a glass in a so-called direct press system, a method and an apparatus capable of molding a glass product which will require a reduced grinding allowance when it is processed into a final glass product.

It is a specific object of this invention to provide a method and an apparatus capable of effectively reducing the heat energy of a molten glass and significantly reducing the temperature difference between inner and outer peripheral parts of the molten glass to effectively suppress occurrence of sink marks on a glass surface after a pressing step.

It is another object of this invention to provide a method and an apparatus for molding a glass product, which are capable of suppressing occurrence of sink marks concentrated to a local area of a glass surface.

It is still another object of this invention to provide a method and an apparatus for molding a glass product, which are capable of suppressing occurrence of sink marks without decreasing a productivity attained in a direct press system.

It is an additional object of this invention to provide a method of producing a glass product capable of reducing grinding and polishing amounts According to this invention, a method of molding a glass product by pressing a glass gob by the use of a mold composed of an upper die and a lower die, each of the upper and the lower dies having a molding surface, comprises at least the following steps. Specifically, the method comprises a supplying step of supplying as a glass gob a molten glass onto the molding surface of the lower die, a cooling step of cooling an upper surface of the glass gob supplied onto the molding surface of the lower die, a heat radiation suppressing step of suppressing heat radiation from the glass gob so that an inner part and an upper part of the glass gob are close in temperature to each other, and a pressing step of pressing the glass gob by the molding surfaces of the upper and the lower dies when the glass gob has a viscosity within a range between $10^{3.5}$ and $10^{6.5}$ poises (dPa·s). The heat energy of the glass gob supplied onto the lower die is removed in a short time by cooling the upper surface of the glass gob with cooling means, for example, a cooling member to be contacted with the upper surface. Thus, the total heat energy of the glass gob is made to be close to that corresponding to optimum pressing. Furthermore, after the upper surface is cooled in the cooling step so that the temperature difference between the inner part and the upper surface is increased, heat radiation from the glass gob is suppressed in a time period after the cooling step and before the pressing step so that the temperature of the inner part and the temperature of the upper surface are made to approach each other while the total energy of the glass gob is not substantially reduced. Thus, the glass gob as a whole is kept at a relatively high viscosity before the pressing step. By pressing the glass in the above-mentioned state, it is possible to reduce heat shrinkage of the glass after pressing and to reduce the difference in heat shrinkage between the inner and the outer peripheral parts of the glass. Thus, occurrence of sink marks on a glass surface is suppressed.

According to this invention, there is provided a method of producing a final glass product from a glass product molded by pressing a glass gob, the method comprising the steps of molding the glass product by the use of the above-mentioned method and grinding and polishing a surface of the glass product to produce the final glass product.

In this invention, in the cooling step of cooling the upper surface of the glass gob, the cooling means may directly act upon the molten glass or the glass gob, for example, by bringing a cooling member into contact with the glass gob or may indirectly act upon the glass gob, for example, by blowing cool air to the glass gob. It is noted here that a time period before the pressing step is limited because the lower part of the glass gob is cooled by the lower die preliminarily held around the glass transition point Tg and, if the lower part is excessively cooled so that its viscosity is increased beyond a particular level, press-molding becomes impossible. In order to reserve, within the above-mentioned limited time period, a longer time sufficient to achieve uniform heat distribution in the glass gob in the subsequent heat radiation suppressing step, it is preferable to use the directly-acting cooling means having a high cooling effect and to complete the cooling step in a short time. It is desired that the cooling member is held at a temperature as low as possible within a range such that no quality defect is produced in the glass gob when it is contacted by the cooling member. Furthermore, it is desired that the cooling member is not likely to contaminate the glass gob and has a large heat capacity as well as a high heat conductivity. The cooling member must have a certain level of heat resistance because it is brought into contact with the glass gob, i.e., the molten glass. Specifically, the cooling member is preferably made of a solid metal material. For example, copper is suitable because the heat conductivity is high and the melting point is not lower than 1000° C. Although the heat conductivity is not so high, iron is low in cost and easy in machining and can be used without any problem in function. The cooling member may have various structures. Preferably, the cooling member has a circular section so as to avoid the temperature difference in the circumferential direction of the glass gob and is provided with a hole formed at its center to extend in a vertical direction. Preferably, the cooling member continuously carries out a cooling operation (air-cooling or water-cooling) so as to maintain a predetermined low temperature.

In this case, the step of cooling the upper surface of the glass gob may include the step of bringing a heat absorber into contact with the upper surface of the glass, preferably, the step of forcing the heat absorber to a predetermined depth, or the step of forcing the heat absorber at a predetermined contact area to a predetermined depth. Prior to contact with the glass gob, the heat absorber is preferably kept at a predetermined temperature lower than the temperature of the glass gob so as to maintain reproducibility of the cooling conditions.

Preferably, the heat radiation suppressing step of suppressing heat radiation from the glass gob includes the step of making a heat shielding member lower in temperature than the inner part of the glass gob approach the upper part of the glass gob in a non-contact state for a predetermined period or time interval (preferably, 3 to 50 seconds). Preferably, the above-mentioned step is performed by making the heat shielding member having an emissivity of 0.4 or less at least at its surface facing the upper surface of the glass gob approach the upper surface of the glass gob in a non-contact state. By performing this step, the temperature difference between the inner part and the upper surface of the glass gob is preferably suppressed to 100° C. or less, preferably 50° C. or less, more preferably 30° C. or less.

Preferably, a plurality of lower dies are transferred successively to operating positions for the above-mentioned steps to carry out the above-mentioned steps.

Preferably, the lower dies are arranged on a turntable in a circumferential direction and transferred by the rotation of the turntable successively to the operating positions for the above-mentioned steps to carry out the above-mentioned steps.

Preferably, the glass product molded by the above-mentioned method is an optical lens material.

According to this invention, an apparatus for molding a glass product comprises a mold composed of an upper die and a lower die each of which has a molding surface, supplying means for supplying a molten glass as a glass gob onto the molding surface of the lower die, cooling means for cooling an upper surface of the glass gob supplied onto the molding surface of the lower die, heat radiation suppressing means for suppressing heat radiation from the glass gob cooled by the cooling means so that an inner part and an upper part of the glass gob are close in temperature to each other, and mold driving means for making the molding surfaces of the upper and the lower dies approach each other to press the glass gob. When the glass gob whose inner part and the upper surface are made to close in temperature to each other by the heat radiation suppressing means has a viscosity within a range between $10^{3.5}$ and $10^{6.5}$ poises (dPa·s), the mold driving means is activated to press the glass gob.

Preferably, the heat radiation suppressing means comprises a heat shielding member lower in temperature than the inner part of the glass gob and means for making the heat shielding member approach the upper part of the glass gob in a non-contact state.

Preferably, the heat shielding member has an emissivity of 0.4 or less at least at its surface facing the upper surface of the glass gob. More preferably, the heat shielding member comprises a heat insulator material coated with a coating layer having an emissivity of 0.4 or less at least at its surface facing the upper surface of the glass gob.

DESCRIPTION OF THE PREFERRED EMBODIMENT

Figure 1:
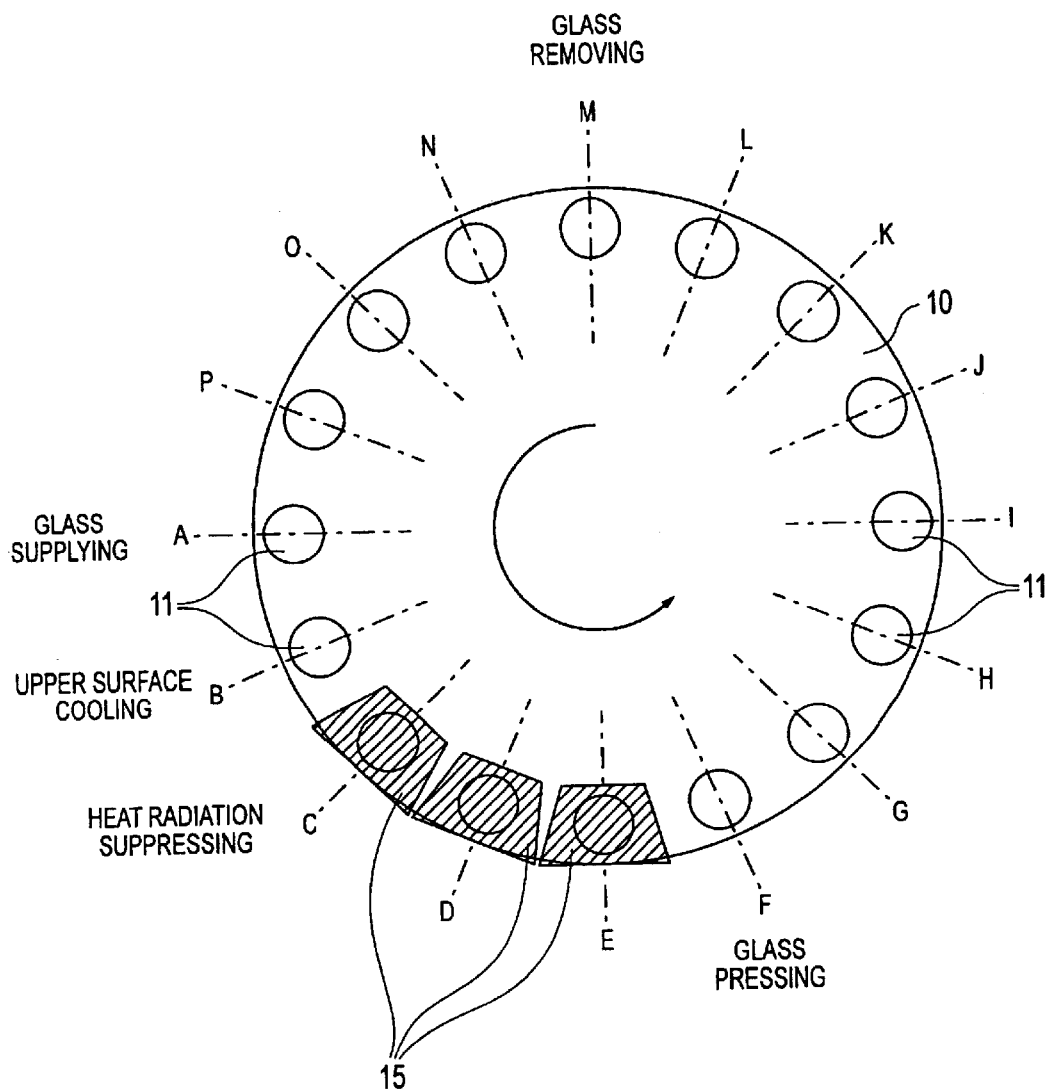
FIG. 1 is a view showing a turntable with a plurality of operating positions for a plurality of steps in a method according to this invention.

Now, description will be made about one embodiment of this invention with reference to the drawing. In the following, description is directed to a method of molding an optical lens blank as a glass product by the use of a press-molding apparatus comprising a turntable as a conveying arrangement and sixteen lower dies arranged on the turntable in a circumferential direction. Upon referring to the temperature of a glass gob, a region contacting a molding surface of the lower die and its neighborhood will be referred to as a lower part of the glass while another region exposed to ambient air without contacting the molding surface of the lower die and its neighborhood will be referred to as an upper part of the glass. Furthermore, a portion of the upper part of the glass which is to be pressed by a molding surface of an upper die will be referred to as an upper surface.

Referring to FIG. 1, a plurality of operating positions A through P for respective steps of the method of this invention are defined on a turntable 10. As illustrated in the figure, a plurality of lower dies 11, sixteen in number, are arranged on the turntable 10 in a circumferential direction. Energized by a driving unit (not shown), the turntable 10 is rotated stepwise to successively transfer the lower dies 11 to the operating positions A through P for the respective steps. Specifically, the turntable 10 is rotated from a stationary or rest state by a 1/16 circle (i.e., a degree of 22.5°) to transfer each lower die 11 from one operating position to a next operating position where the turntable 10 is stopped to return to the stationary state. For a predetermined time period corresponding to an operating time of each step, the lower die 11 rests on each operating position and is transferred to the next operating position after lapse of the predetermined time period. For example, a time interval between one stationary state and a next following stationary state, i.e., one pitch period ranges between 2 and 6 seconds.

The method of this embodiment comprises the step of supplying a molten glass as a glass gob (hereinafter called a glass supplying step), the step of cooling an upper surface of the glass gob before pressing (hereinafter called an upper surface cooling step), the step of suppressing heat radiation from the glass gob to make an inner part and an upper surface of the glass gob close in temperature to each other (hereinafter called a heat radiation suppressing step), the step of pressing the glass gob into a pressed glass (hereinafter called a glass pressing step), and the step of removing the pressed glass from the mold to obtain the glass product (hereinafter called a glass removing step). In FIGS. 2A through 2H, the glass is molded through the above-mentioned steps. In these figures, the operating positions A through P and the names of the steps are indicated in correspondence to those illustrated in FIG. 1.

Figure 2A:
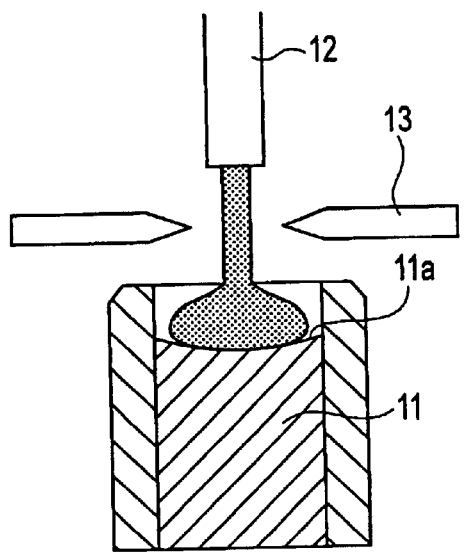
FIGS. 2A through 2H are schematic diagrams for describing the respective steps in the method according to this invention.
Figure 2B:
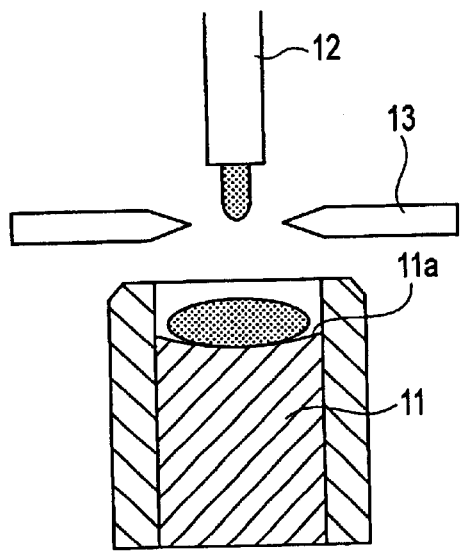

The glass supplying step is carried out at the position A in FIG. 1. Above the position A, a glass melting furnace (not shown) is arranged as well as a shear 13 (FIG. 2A) for cutting the molten glass flowing down from the glass melting furnace. A glass material adapted to a desired optical lens is supplied to the melting furnace and heated in the melting furnace to obtain the molten glass kept at a temperature between 1000 and 1100° C. In this embodiment, use is made of an $SiO_2$—$TiO_2$ glass having a glass transition point (Tg) of 615° C. and a softening point (Ts) of 650° C. As illustrated in FIGS. 2A and 2B, the molten glass is made to flow down through a platinum pipe 12 towards the lower die 11 at the position A. Taking into account a flow rate, the molten glass is cut by the shear 13 at a predetermined time interval to supply an appropriate amount of the molten glass onto a molding surface 11a of the lower die 11. The molten glass on the molding surface 11a is rounded by its surface tension to become a marble-like shape called a glass gob.

Referring to FIG. 1, heating is carried out over a substantially entire area of the turntable 10 so that the lower die 11 at the position A is kept at a predetermined temperature. The temperature control of the lower die upon supply of the glass is important in order to prevent early solidification due to a low temperature of the lower part of the glass gob and resultant loss of flowability and to prevent fusion bonding of the molten glass as the glass gob to the lower die due to a high temperature of the lower part of the glass gob. As will later be described, when the molten glass is supplied onto the molding surface of the lower die, the lower part of the glass is rapidly cooled by heat exchange between the lower part of the glass and the molding surface of the lower die. In order to avoid the two contradictory problems mentioned above, the lower part of the glass gob supplied to the molding surface of the lower die is preferably kept at a temperature slightly lower than the transition point (Tg) of the glass, i.e., at a temperature between Tg and Tg–50° C., preferably between Tg and Tg–30° C., more preferably between Tg and Tg–10° C. In the embodiment, the lower die is heated to a temperature of Tg–10° C. so that the temperature of the lower die after supply of the molten glass as the glass gob and the temperature of the lower part of the glass gob are kept in an equilibrium at a level slightly lower than the transition point Tg.

Figure 2C:
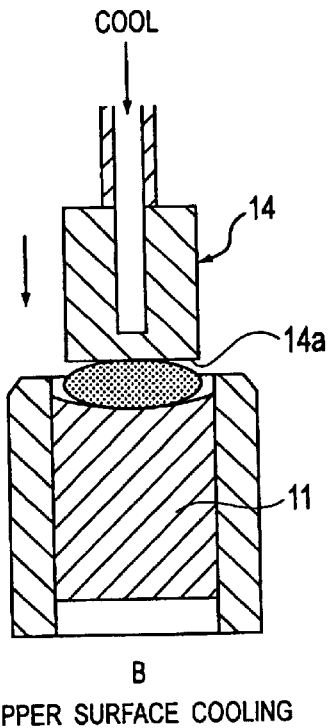

The lower die 11 supplied with the glass gob at the position A is transferred by one-step rotation of the turntable 10 to the position B for the upper surface cooling step. At the position B, a cool press unit is arranged to carry out the upper surface cooling step. As illustrated in FIG. 2C, the cool press unit comprises a heat absorber 14 made of a metal material and having a flat contact surface 14a to be contacted with the glass gob. The heat absorber 14 is moved up and down by an elevating unit (not shown). When the turntable 10 is rotated and the lower die with the glass gob received thereon is transferred to the position B, the elevating unit is driven to move down the heat absorber 14. By the downward movement of the heat absorber 14, the contact surface 14a is pressed against the upper surface of the glass gob to slightly deform the glass gob. Thus, face contact between the upper part of the glass gob and the contact surface 14a of the heat absorber 14 is achieved. Prior to the contact with the glass gob, the heat absorber 14 and the contact surface 14a are kept at a predetermined holding temperature lower than the temperature of the glass gob. By maintaining the contact between the glass gob and the contact surface 14a of the heat absorber 14 for a preselected time duration, the heat of the glass gob, in particular, the heat of the upper part thereof is transferred to the heat absorber 14. As a result, the temperature of the glass gob, in particular, the temperature of the upper part of the glass gob is quickly lowered. In the embodiment, the heat absorber 14 is made of iron (having a heat conductivity between 73 and 30 W/m·K). Alternatively, use may be made of other metal materials such as copper (having a heat conductivity between 166 and 180 W/m·K). In case where the heat absorber 14 has a relatively low heat conductivity or is kept at a higher holding temperature prior to the contact with the glass gob, the cooling effect is reduced. In order to optimize the temperature condition of the glass gob after the upper surface cooling step, selection is appropriately made of the metal material of the heat absorber 14, the holding temperature, the contact area between the glass and the heat absorber 14, the contact time of contact between the glass and the heat absorber 14, and the press stroke.

If the heat absorber 14 is brought into contact with the glass gob under a predetermined pressure, production of wrinkles on the lower surface of the glass gob, i.e., the surface contacting the lower die, is suppressed as a subsidiary effect. These wrinkles are generally called gob lines which result in surface defect on the lower surface of the glass gob and in increase of the grinding allowance.

In the upper surface cooling step mentioned above, the heat absorber may have a molding surface similar in shape to the molding surface of the upper die which is used in the glass press step carried out later. In this event, the upper surface cooling step also serves as a preliminary press step. By carrying out the preliminary press step prior to the glass press step, the reproducibility of the glass shape with respect to the mold in the glass press step is further improved.

After the upper surface cooling step, the glass gob is transferred to the heat radiation suppressing step. In this embodiment, the heat radiation suppressing step is continuously carried out at the positions C, D, and E in FIG. 1. The heat radiation suppressing step serve to suppress heat radiation from the surface of the glass gob once cooled in the upper surface cooling step previously carried out to thereby achieve uniform heat distribution by heat exchange between the upper surface and the inner part. In order to carry out the heat radiation suppressing step, heat shielding members 15 are arranged at the positions C, D, and E exactly above cylindrical dies and the lower dies without any substantial gap between every adjacent ones. Desirably, the heat shielding members 15 are arranged along a track or a circuit on the turntable 10 from a position immediately after the end of the upper surface cooling step to another position immediately before the start of the glass press step without any substantial gap between every adjacent ones as illustrated in FIG. 1 so that its function is exhibited even during the rotation of the turntable 10.

Preferably, the heat shielding member is made of a low-emissivity material at least at its surface facing the upper surface of the glass gob so that heat radiation from the glass gob is hardly absorbed. The above-mentioned surface preferably has an emissivity of 0.4 or less, more preferably 0.1 or less.

Furthermore, the heat shielding member has a metal surface, preferably, a polished metal surface, at least as the surface facing the upper surface of the glass gob. Generally, the polished metal surface has a very low emissivity (around 0.1). However, if the metal surface is oxidized, the emissivity is considerably increased. Since the heat shielding member is located adjacent to the molten glass as the glass gob for a long time, the heat shielding member is preferably made of a metal material capable of keeping surface luster or glaze (low emissivity) even at a relatively high temperature. For example, use is preferably made of a metal material such as platinum and nickel.

Ceramics is excellent in heat resistance but has a relatively large emissivity as compared with a polished metal surface (in case of alumina, the emissivity at 540° C. is approximately equal to 0.7). In practical application, a nickel plate resistant against oxidation at a relatively high temperature is used because platinum is expensive.

Figure 2D:
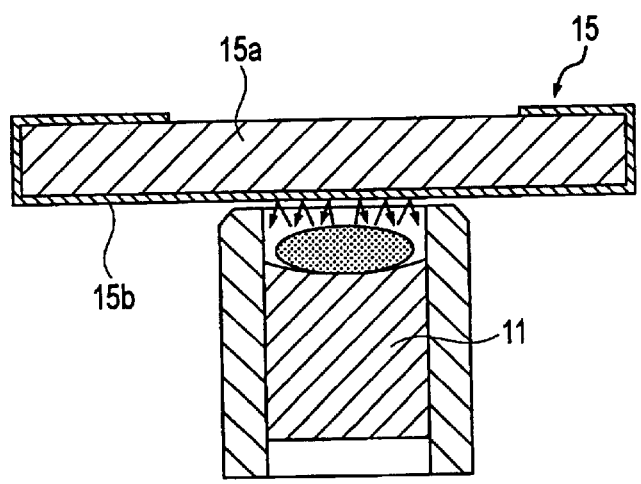

If the heat shielding member has a large heat capacity, cooling ability is increased due to the difference in temperature from the glass gob. Therefore, in view of the performance, the heat shielding member preferably has a composite structure comprising a material having an emissivity of 0.4 or less as the surface facing the upper surface of the glass gob and another material having a heat capacity as small as possible and a low heat conductivity as an inner part. Referring to FIG. 2D, the heat shielding member 15 comprises a heat insulator 15a having a small heat capacity and a coating 15b covering the heat insulator 15a and having an emissivity of 0.4 or less. Such a composite structure achieves the heat shielding effect and the insulating effect. In practical application, a ceramics fiber board having a thickness of 20 mm and excellent heat insulation is coated with a metal (nickel) thin plate having a thickness of 0.5 mm.

Herein, the heat shielding member must be kept at a temperature lower than that of the inner part of the glass gob to prevent the glass gob from being heated by the approach of the heat insulating member. Preferably, the heat shielding member is kept at a temperature within a range between the grass transition point Tg and the average temperature of the glass gob.

The upper surface cooling step and the heat radiation suppressing step mentioned above serve to optimize the temperature conditions, i.e., the viscosity of the glass gob when the glass gob is pressed in the glass press step subsequently carried out and after the glass press step. Specifically, through the upper surface cooling step prior to the glass press step, a required amount of the heat energy is quickly removed from the glass gob. In this event, the temperature difference between the inner and the outer peripheral parts of the glass gob is at first increased. Then, in the heat radiation suppressing step subsequently carried out, the heat radiation from the surface is suppressed while the heat exchange is carried out between the inner part and the outer peripheral part of the glass gob (particularly, the upper part of the glass gob) to reduce the temperature difference therebetween so that a whole of the glass gob approaches a uniform viscosity (temperature).

In this embodiment using the turntable, the operating time of the upper surface cooling step is defined by a stop period of the turntable 10. In other words, in the upper surface cooling step, the operations of lowering the heat absorber 14, cooling the glass gob, and retracting the heat absorber 14 upward must be performed within the stop period of the turntable 10 repeating the predetermined stepwise rotation. For example, the cooling time by the heat absorber 14 is selected between 1 and 3 seconds. The operating time of the heat radiation suppressing step is defined by a time period from the start of transfer of the lower die 11 from the position B (upper surface cooling step) to the completion of the transfer to the position F (glass press step). Preferably, the operating time of the heat radiation suppressing step is selected within a range between 3 and 50 seconds. In this embodiment, the operating time is between 15 and 20 seconds.

Figure 2E:
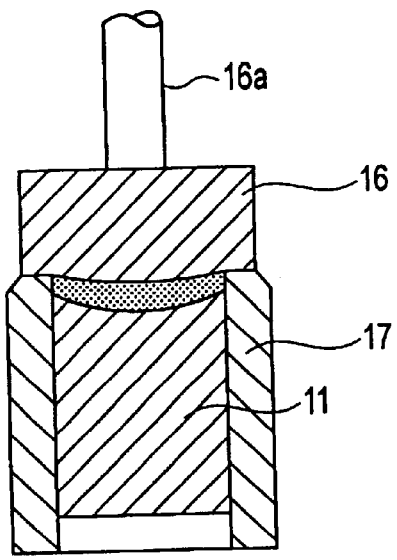
Figure 2F:
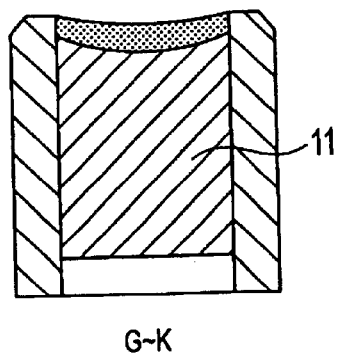

The glass gob controlled in temperature in the upper surface cooling step and the heat radiation suppressing step is thereafter transferred to the position F to be pressed (execution of the glass press step). As illustrated in FIG. 2E, an upper die 16 having a glass molding surface on its lower surface is used in the glass press step. Upon the glass gob transferred to the position F, the upper die 16 is moved down by an elevating unit having a drive shaft 16a coupled to the upper die 16 to thereby press the glass gob.

In this invention, a timing of carrying out the glass press step is important. Specifically, the glass press step is carried out when the inner part of the glass gob controlled in temperature via the upper surface cooling step and the heat radiation suppressing step has a viscosity between $10^{3.5}$ and $10^{6.5}$ poises (dPa·s), preferably between $10^4$ and $10^6$ poises (dPa·s), more preferably between $10^{4.5}$ and $10^{5.5}$ poises (dPa·s). In the embodiment, the glass press step is carried out at the viscosity of $10^5$ poises (dPa·s). In the glass press step, the outer peripheral part of the glass gob is preferably kept at a temperature between Tg and Tg+50° C. In the embodiment, the glass gob is kept at a temperature of Tg+10° C. The above-mentioned viscosity is much higher than the viscosity between $10^2$ and $10^3$ poises (dPa·s) upon pressing in the existing direct press system. The reason why the pressing is carried out at such a high viscosity is to suppress heat shrinkage of the glass after pressing and to reduce occurrence of sink marks on the glass surface. With reference to the transfer speed of the glass gob transferred by the turntable, it is possible to set an appropriate press timing by changing the operating position of the glass press step, for example, to the position G or H. In the glass press step mentioned above, the press pressure is equal to about six times that of the existing direct press system so as to completely roll the glass gob having a high viscosity within the cavity. The press pressure is between 2.942 and 7.845 MPa, preferably between 4.903 and 6.865 MPa. In the embodiment, the press pressure is approximately equal to 6.472 MPa.

It is important how to stably carry out the glass press step in the above-mentioned conditions. As will later be described, the lower part of the glass is inevitably cooled continuously towards a lower temperature after the molten glass is supplied onto the molding surface of the lower die. Therefore, the timing of carrying out the glass press step must be determined to a particular time instant under the restriction in temperature condition of the lower part of the glass gob. Beyond the particular time instant, the viscosity of the lower part of the glass exceeds the range adapted to press molding. If the pressing is carried out in such a state, the molding quality is insufficient. Therefore, within a limited time period before the particular time instant, the glass press step must be carried out at a time instant when the upper part of the glass gob is put into an optimum condition (viscosity) for press molding and when the inner part and the outer peripheral part of the glass gob are close in temperature to each other.

In order to make inner part and the outer peripheral part of the glass gob close in temperature to each other, one approach is to heat the upper surface after the upper surface cooling step. However, the heat radiation suppressing step of this invention is distinguishable from the above-mentioned approach. Specifically, in order to make the upper part of the glass gob uniformly have a viscosity at or around a desired level within the above-mentioned limited time period, the glass gob must be reduced in heat energy after it is supplied to the lower die. Herein, the heat energy which the glass gob has when the molten glass is supplied to the lower die as the glass gob will be called an initial heat energy. It is noted here that the temperature of the lower part of the glass is quickly lowered by the contact with the molding surface of the lower die while the temperature of the inner part of the glass is not easily lowered to a temperature corresponding to the viscosity adapted to pressing if the initial heat energy of the glass gob is great. If the glass is reheated by an external source under such limitation related to the initial heat energy of the glass gob, it is difficult to control the heat energy of the glass gob within the limited time period from the cooling step to the glass press step. For example, when the glass gob is reheated to achieve uniform heat distribution, excessive heating results in an excessively low viscosity. In the glass press step, the glass gob having such an excessively low viscosity extrudes through a clearance between components forming the mold, specifically, a clearance between the upper and the lower dies or a clearance between the upper and the cylindrical dies. This may cause various disadvantages, such as the defect in shape and quality, the damage of the mold, considerable reduction in the life of the mold, and an increase in production cost.

Furthermore, in reheating the glass gob to achieve uniform heat distribution, it is difficult to define a reference for power control of a heater for reheating the upper part of the glass. In addition, extra energy is required to reheat the upper part of the glass gob which has once been cooled.

In order to increase the effect in a short operation time and in order to have an ability to soften a wide variety of glasses, the heater for reheating is required to have a heating capacity of 1000° C. or more in practical use. Therefore, an inexpensive Nichrome heater is not thermally resistant or durable and an applicable material for the heater is restricted and is very costly. This brings about an increase in production cost. Even if the expensive heater is used, occurrence of troubles, such as line interruption, will be inevitable during the use for a long period of time. This results in a decrease in operation rate of a production process.

In this embodiment, the upper part of the glass gob is not reheated in a time period after the cooling step and before the glass press step. Instead, the upper surface of the glass gob is covered with the heat shielding member in a non-contact state so that the heat radiation from the glass gob is suppressed to thereby decrease the difference in temperature between the inner part and the outer peripheral part of the glass gob. Therefore, in order to achieve uniform heat distribution prior to the press molding in the glass press step, it is possible to effectively use a part of the initial heat energy of the glass gob which is carried by the molten glass when it is supplied onto the lower die as the glass gob. Therefore, for the control of the heat energy of the glass gob, it is only necessary to control the heat energy removed in the upper surface cooling step. Thus, the control of the heat energy is simplified. In addition, the upper part of the glass gob is prevented from being excessively lowered in viscosity (in particular, the upper surface of the glass gob is prevented from being lower in viscosity than the inner part). This suppresses the occurrence of quality defects such as "molding burr" of the glass gob by the press molding. Furthermore, the heat energy and the heater for reheating are no longer required. This prevents the decrease in operation rate of the production process as a result of the line interruption of the heater.

As described above, in this embodiment, the upper part of the glass gob is not reheated in the time period between the cooling step and the glass press step. Therefore, in the upper surface cooling step, the initial total heat energy of the glass gob supplied onto the molding surface of the lower die must be reduced in a short time to the amount slightly larger than a target total heat energy which the glass gob presumably has when the viscosity adapted to the press molding is later achieved uniformly throughout the glass gob. In the heat radiation suppressing step, a predetermined heat energy is removed from the glass gob irrespective of the function of the heat radiation suppressing step. Therefore, the cooling conditions in the upper surface cooling step (for example, the time duration in which the heat absorber is to be contacted with the upper surface of the glass gob, the temperature of the heat absorber when it is contacted with the glass gob) are determined so as to achieve a proper viscosity condition upon pressing, taking into account the above-mentioned removal of the heat energy in the heat radiation suppressing step.

As described above, during the time period after supply of the molten glass as the glass gob and before the press molding, restriction is imposed such that the lower part of the glass gob must have a viscosity which does not exceed a proper viscosity range in which the pressing is possible. Therefore, it is preferable to continuously carry out the upper surface cooling step, the heat radiation suppressing step (the step of reducing the difference in temperature between the inner part and the upper surface of the glass gob), and the glass press step. In this manner, the heat shielding member can be located near the upper surface of the glass gob from an early stage as early as possible following the cooling step to a later stage immediately before the press molding step. Thus, before the lower part of the glass gob exceeds the proper viscosity range, the glass gob is given more uniform heat distribution.

In the heat radiation suppressing step, it is preferable to reduce an exposed area of the glass gob as small as possible in order to suppress heat radiation from the glass gob except the heat radiation to the lower die. To this end, at least during the heat radiation suppressing step, the glass gob must be accommodated in a cavity of the lower die or a cavity defined by the lower die and the cylindrical die with its upper surface covered with the heat shielding member. For example, in order to cool the upper part of the glass gob in the upper surface cooling step, the glass gob on the molding surface of the lower die is pushed by the heat absorber so that the glass gob is accommodated in the cavity of the lower die or the cavity defined by the lower die and the cylindrical die. Alternatively, in the heat radiation suppressing step, the lower die is lowered relative to the cylindrical die to lower the upper surface of the glass gob below the upper end of the cylindrical die so that the glass gob is accommodated in the cavity defined by the lower die and the cylindrical die. In either event, the heat shielding member is preferably located closely adjacent to the upper end of the cylindrical die as far as the shielding member is not brought in contact with the glass gob, in view of the reduction in amount of the heat radiation.

By accommodating the glass gob in the cavity of the lower die or the cavity defined by the lower die and the cylindrical die in the heat radiation suppressing step as described above, the glass gob is prevented from being brought into contact with the heat shielding members even if the lower die with the glass gob placed thereon is transferred below the heat shielding members. Therefore, the heat radiation suppressing step can be carried out during the transfer of the lower die from the operating position of the upper surface cooling step to the operating position of the glass press step. Thus, it is possible to efficiently achieve uniform heat distribution of the glass gob within a limited time period.

The time duration of the heat radiation suppressing step is selected within a limit beyond which the press molding is difficult after the lower part of the glass gob is cooled by heat exchange with the lower die and is lowered in temperature to or around the glass transition point Tg. Depending upon the temperature of the lower die and the heat capacity of the glass gob, the duration is preferably selected within a range between 3 and 50 seconds.

Figure 2G:
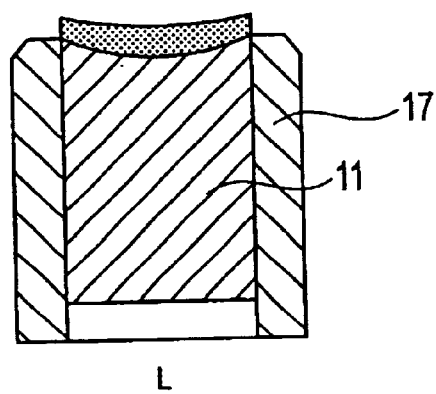
Figure 2H:
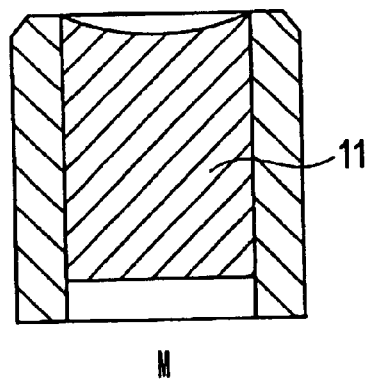

Then, the glass pressed at the position F in FIG. 1 is transferred via the positions G through L to the position M where it is taken out. While the glass is transferred via the positions G through L to the position M, the glass is gradually spontaneously cooled by the atmospheric temperature so that the volume is slightly reduced by heat shrinkage. In the existing direct press system, the problem of sink marks occurs in the process of heat shrinkage of the glass gob after pressing. In this invention, the temperature difference between the inner and the outer peripheral parts of the glass is reduced by appropriate temperature control of the glass gob prior to the glass press step. As a result, the temperature difference between the inner and the outer peripheral parts of the glass upon and after pressing is also reduced so that the occurrence of sink marks is suppressed. In each of the positions G through M, the lower die 11 is gradually elevated with respect to the cylindrical die 17. As illustrated in FIG. 2G, the outer peripheral surface of the glass is located above the cylindrical die 17 at the position L. As illustrated in FIG. 2H, the glass is vacuum-sucked by a pickup unit (not shown) and taken out from the mold when the temperature of the inner part of the glass is within a range of ±50° C., preferably ±30° C., more preferably ±10° C. with respect to the transition point.

Thus, by the method of this invention, the optical lens blank is molded without causing the molding burr of the glass. The optical lens blank thus molded is an intermediate or unfinished product and is subsequently subjected to surface grinding/polishing to produce an optical lens. The lens blank molded by the method of this invention has less sink marks on its surface and can therefore reduce the grinding allowance. The evaluation of the optical lens blank experimentally obtained according to this embodiment shows the following result. The grinding allowance could be reduced to 50% as compared with the existing system.

| | |
|---|---|
| One-Side Finishing Allowance | 0.3–0.35 mm |
| Center Thickness Tolerance | 0.1 mm |
| Outer Diameter Tolerance | 0.1 mm |
| Thickness Deviation | 150 μm or less |
| Accuracy in Radius of Curvature | 80 μm |
| Size of Stones on Lower Surface of Pressed Product | 200 μm or less |

Herein, the one-side finishing allowance is a grinding allowance in grinding the upper surface or the lower surface of the pressed product. The center thickness tolerance is a difference between a preselected center thickness and a measured center thickness. The thickness deviation is a difference between a maximum thickness and a minimum thickness on a common circumference. The accuracy in radius of curvature is a difference between a preselected radius of curvature and a measured radium of curvature. The stones on the lower surface of the pressed product are foreign matters, for example, heat-resistant solid lubricant powder made of hexagonal BN (boron nitride) or the like that spread on the lower die in order to improve releasability when the pressed product is removed or separated from the mold.

In this embodiment, a plurality of the lower dies are arranged on the turntable. Alternatively, the conveying arrangement may be of any other type as far as the lower dies can be transferred successively to the positions for the respective steps and can be repeatedly used in a succession of the steps. For example, a linear conveyor such as a belt conveyor can be used.

Figure 3:
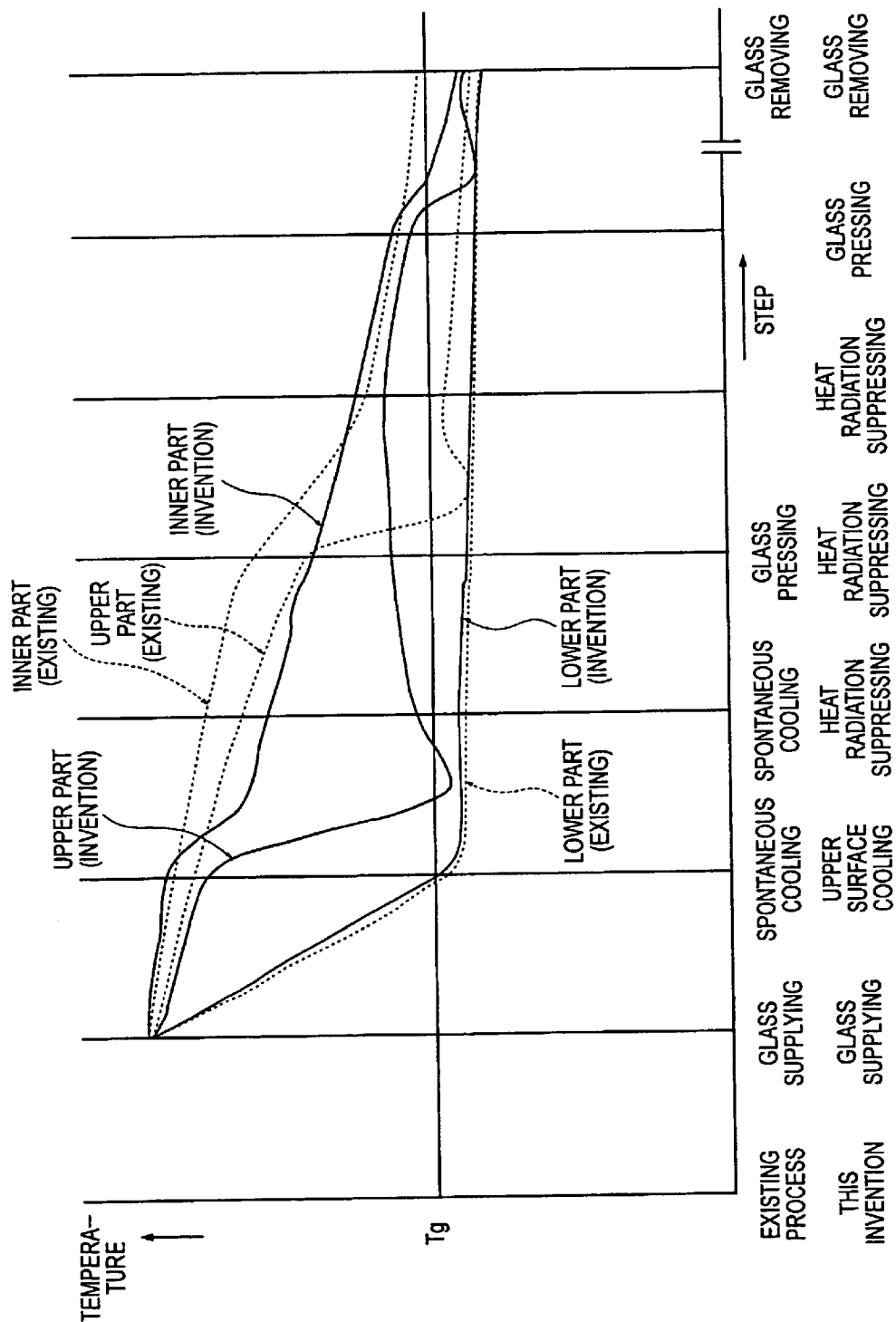
FIG. 3 is a view for describing the method of this invention with reference to temperature conditions of inner and outer peripheral parts of a glass gob after it is supplied onto a lower die and before a lens blank is taken out.

Next, description will be made about the temperature conditions of the molten glass in the respective steps. Referring to FIG. 3, the glass has different temperature conditions in the inner and the outer peripheral parts of the glass after the glass gob is supplied onto the lower die and before the lens blank is taken out. In the figure, the temperature variations of the glass in the upper, the center, and the lower parts in the method of this invention are depicted by solid lines. On the other hand, the temperature variations of the glass in the upper, the center, and the lower parts in the existing direct press system without the upper surface cooling step and the heat radiation suppressing steps are depicted by broken lines in the figure.

Prior to description of the temperature variations of the glass in this invention, description will briefly be made about the temperature variations of the glass in the existing system. When the molten glass is supplied onto the molding surface of the lower die in the glass supply step, the temperature of the lower part of the glass is rapidly lowered by heat exchange between the lower die kept at the temperature on the order of Tg–10° C. and the lower part of the molten glass and is kept in an equilibrium at a level lower than the glass transition point Tg. On the other hand, the upper and the inner parts of the glass supplied onto the molding surface of the lower die are cooled by the atmospheric temperature around the glass to be gradually lowered in temperature. At this time, the temperature variation rate is high in the upper part of the glass as compared with the inner part of the glass. As a result, the difference in temperature between the inner and the upper parts of the glass is gradually increased before the start of the glass press step. In the glass press step, the upper die kept at the temperature around Tg–100° C. cools the upper and the inner parts of the glass gob. At this time, the upper part of the glass is brought into direct contact with the upper die and is therefore rapidly cooled to a temperature lower than the transition point Tg of the glass. On the other hand, the inner part of the glass is less easily cooled as the glass gob is greater in thickness. This results in an increase in temperature difference between the inner part of the glass and each of the upper and the lower parts after the glass press step. Since the viscosity of the glass upon pressing is low, the heat shrinkage of the glass after pressing is great to produce the sink marks on the glass surface.

Next, description will be made about the temperature variations of the glass in this invention along the solid lines in FIG. 3. When the molten glass is supplied onto the molding surface of the lower die in the glass supply step, the temperature of the lower part of the glass is rapidly lowered by heat exchange between the lower die and the lower part of the molten glass and is kept in equilibrium at a level between Tg and Tg–50° C., i.e., not higher than the glass transition point Tg. On the other hand, the upper and the inner parts of the glass supplied onto the molding surface of the lower die are cooled by the atmospheric temperature around the glass and are gradually lowered in temperature. At this time, the temperature variation rate is high in the upper part of the glass as compared with the inner part of the glass. Up to this stage, the temperature variation in each part of the glass is similar to that mentioned above in conjunction with the existing system.

In this invention, when the upper surface cooling step is carried out, the heat energy of the glass gob as a whole is rapidly removed. In particular, the temperature drop in the upper part of the glass gob in direct contact with the cooling member is very rapid as compared with the temperature drop in the inner part. Then, the temperature difference is greater than that in the initial stage when the molten glass is supplied as the glass gob. Next, when the heat radiation from the upper part of the glass gob is suppressed in the heat radiation suppressing step, the temperature of the upper part is elevated again while the temperature of the inner part is lowered by the heat exchange between the inner part and the upper part (surface) of the glass. As a consequence, the temperature difference between the upper part and the inner part of the glass is gradually reduced. The temperature of the lower part of the glass is greatly affected by the temperature of the lower die having a large heat capacity. Therefore, after the molten glass is supplied as the glass gob, the temperature of the lower part is lowered continuously towards the temperature of the lower die preliminarily kept around the glass transition point Tg, although the temperature falling rate is slightly reduced in the heat radiation suppressing step. If the temperature of the lower part of the glass gob is cooled down to or around the glass transition point Tg, the press molding is impossible. Therefore, the limit of the timing for the press molding after the molten glass is supplied to the lower die as the glass gob depends upon the temperature of the lower part of the glass.

In the glass press step, the upper die cools the upper and the inner parts of the glass gob in the manner similar to the existing system. At this time, the upper part of the glass is brought into direct contact with the upper die kept at the temperature between Tg–50 and Tg–150° C. so that the upper part is rapidly cooled to a temperature lower than the glass transition point Tg. Since the temperature of the inner part of the glass gob upon pressing is relatively low as compared with the existing system, the temperature difference between the inner part and the upper part of the glass gob after pressing is relatively small. As a consequence, occurrence of sink marks on the glass surface is suppressed and nonuniform distribution of sink marks is avoided. The viscosity of the inner part of the glass gob after subjected to the upper surface cooling step and the heat radiation suppressing step reaches an appropriate level, i.e., between $10^{3.5}$–$10^{6.5}$ poises (dPa·s) with position-dependent variation suppressed and in a short time as compared with the case where no such steps are carried out. This increases the productivity of the lens blank. The lens blank is taken out from the mold when temperatures of the upper, the center, and the lower parts of the glass approach the transition point Tg through spontaneous cooling at the positions G through L in FIG. 1. Ideally, the lens blank is taken out from the mold when the temperature of each part is within a range of ±10° C. with respect to the transition point Tg.

In the foregoing, one embodiment of this invention has been described in conjunction with the drawing. However, it will readily be understood that this invention is not restricted to the matters given in the embodiment but may be modified and improved in various other manners within a scope of the appended claims.

The method of molding a glass product according to this invention is applicable not only to manufacture of the optical lens blank described above but also to general glass products. In particular, it is very advantageous if this invention is applied to an optical lens having different thicknesses at the center and the peripheral part and to a glass product relatively thick.

As described above, in the press-molding method of a so-called direct press system, it is possible according to this invention to suppress occurrence of sink marks distributed on the surface of the lens blank and to prevent concentration of the sink marks to a local area. As a consequence, it is possible to provide the lens blank which will require a less grinding allowance to be removed in the grinding/polishing step so that the grinding scraps and the polishing scraps are reduced.

According to this invention, the viscosity of the glass can be brought to an optimum viscosity in a short time as compared with the existing system and with position-dependent variation suppressed so that the productivity of the lens blank is improved.

What is claimed is:

1. A method of molding a glass product by pressing a glass gob by the use of a mold comprising an upper die and a lower die, each of said upper and said lower dies having a molding surface, said method comprising:
   a supplying step of supplying as said glass gob a molten glass onto the molding surface of said lower die;
   a cooling step of cooling an upper surface of said glass gob supplied onto the molding surface of said lower die;
   a heat radiation suppressing step of suppressing, after said cooling step, heat radiation from said glass gob so that an inner part and an upper part of said glass gob are close in temperature to each other; and
   a pressing step of pressing, after said heat radiation suppressing step, said glass gob by the molding surfaces of said upper and said lower dies when said glass gob has a viscosity within a range between $10^{3.5}$ and $10^{6.5}$ poises (dPa·s).

2. A method as claimed in claim 1, wherein said heat radiation suppressing step comprises an approaching step of making a heat shielding member lower in temperature than the inner part of said glass gob approach the upper part of said glass gob in a non-contact state.

3. A method as claimed in claim 2, wherein said approaching step is for making said heat shielding member approach the upper part of said glass gob in the non-contact state for a time interval between 3 and 50 seconds, both inclusive.

4. A method as claimed in claim 2, wherein said heat shielding member has an emissivity of 0.4 or less at least at its surface facing the upper surface of said glass gob.

5. A method as claimed in claim 4, wherein said approaching step is for making said heat shielding member approach the upper part of said glass gob in the non-contact state for a time interval between 3 and 50 seconds, both inclusive.

6. A method of producing a final glass product from a glass product molded by pressing a glass gob, said method comprising the steps of:
   molding said glass product by the use of a method claimed in any one of claims 1 through 5; and
   grinding and polishing a product surface of said glass product to produce said final glass product.

7. An apparatus for molding a glass product, comprising:
   a mold comprising an upper die and a lower die, each of said upper and said lower dies having a molding surface;
   supplying means for supplying a molten glass as a glass gob onto the molding surface of said lower die;
   cooling means for cooling an upper surface of said glass gob supplied onto the molding surface of said lower die;
   heat radiation suppressing means for suppressing heat radiation from the glass gob cooled by said cooling means so that an inner part and an upper part of said glass gob are close in temperature to each other; and
   mold driving means for pressing said glass gob by said upper and said lower dies, said mold driving means being activated to press said glass gob when said glass gob whose inner part and the upper surface are made to close in temperature to each other by said heat radiation suppressing means has a viscosity within a range between $10^{3.5}$ and $10^{6.5}$ poises (dPa·s).

8. An apparatus as claimed in claim 7, wherein said heat radiation suppressing means comprises:
   a heat shielding member lower in temperature than the inner part of said glass gob; and
   means for making said heat shielding member approach the upper part of said glass gob in a non-contact state.

9. An apparatus as claimed in claim 8, wherein said heat shielding member has an emissivity of 0.4 or less at least at its surface facing the upper surface of said glass gob.

10. An apparatus as claimed in claim 8, wherein said heat shielding member comprises a heat insulator material coated with a coating layer having an emissivity of 0.4 or less at least at its surface facing the upper surface of said glass gob.

* * * * *